United States Patent
Selinder

[11] 3,813,984
[45] June 4, 1974

[54] SEPARATION NUT

[75] Inventor: Eric P. Selinder, San Pedro, Calif.

[73] Assignee: Hi-Shear Corporation, Torrance, Calif.

[22] Filed: July 12, 1972

[21] Appl. No.: 270,949

[52] U.S. Cl. ............. 85/33, 85/DIG. 1, 89/1 B
[51] Int. Cl. ............................................. F16b 37/08
[58] Field of Search .......... 85/33, 1 R; 89/1 B; 285/316, 18; 151/19 R

[56] References Cited
UNITED STATES PATENTS

| 2,432,933 | 12/1947 | Peterson | 85/DIG. 1 |
| 2,643,696 | 6/1953 | Minch | 151/19 R |
| 3,405,593 | 10/1968 | Kriesel | 85/33 |
| 3,409,045 | 11/1968 | Mackey et al. | 285/316 X |

FOREIGN PATENTS OR APPLICATIONS

| 779,032 | 2/1968 | Canada | 85/33 |
| 736,008 | 8/1955 | Great Britain | 85/33 |

Primary Examiner—Ramon S. Britts
Attorney, Agent, or Firm—Donald D. Mon

[57] ABSTRACT

A separation nut wherein a segmented, internally threaded nut is releasable from a mating threaded male element, such as a stud or bolt as a consequence of fluid pressure applied to the separation nut. The nut includes a plurality of nut segments which are grouped around a central axis of joinder, and which are held in position to receive the male threaded element by a pair of axially shiftable latch members which are movable in opposite directions relative to each other for unlatching the segments and enabling them to be released from the threaded element. The latch members are actuated by substantially equal and opposite forces, whereby a minimum of unbalanced force is applied to surrounding structures by the separation forces. Optionally, a sequentially operating expulsion device may be provided in the separation nut to eject the threaded element after unlatching has taken place.

23 Claims, 9 Drawing Figures

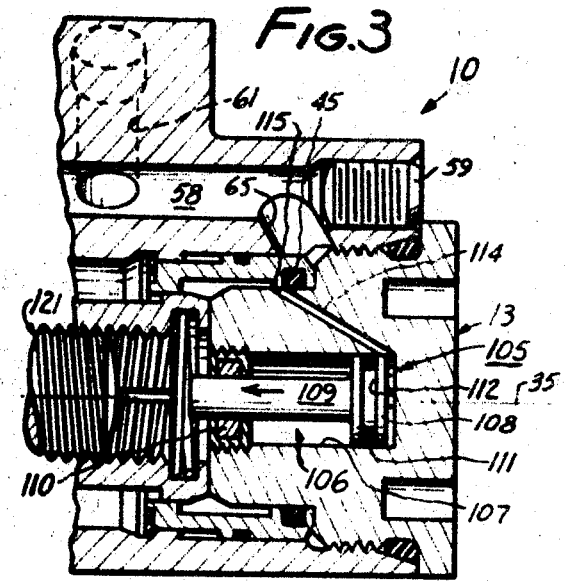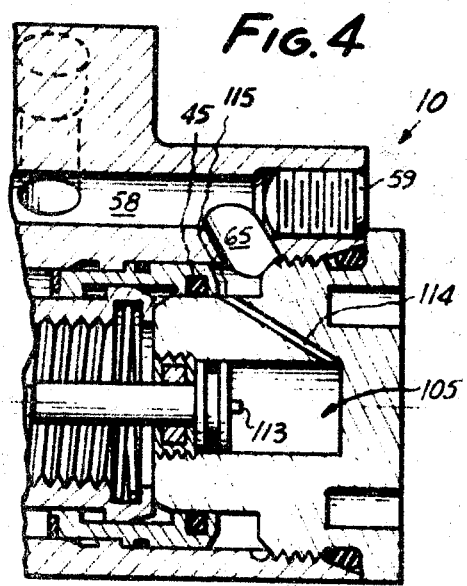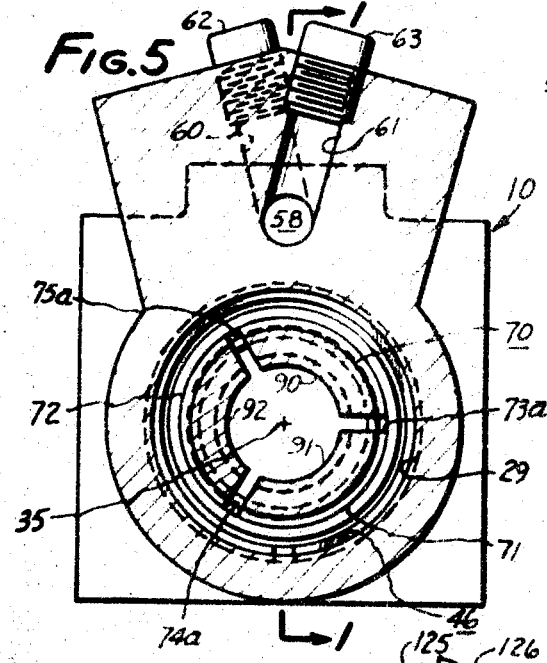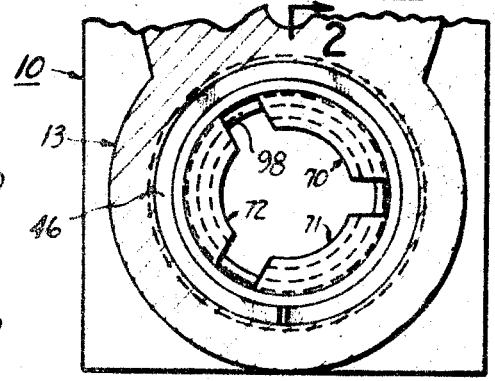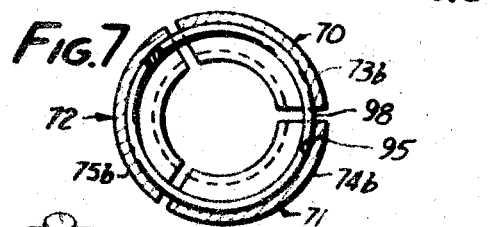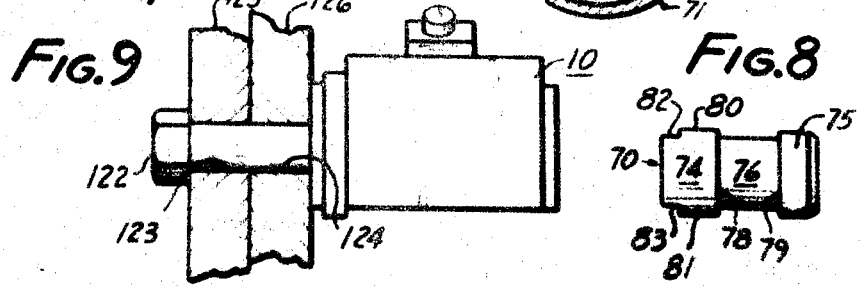

SEPARATION NUT

This invention relates to a separation nut of the type which is mechanically attachable to an externally threaded element, and which can be released therefrom by the exertion of fluid under pressure.

Separation nuts for the aforesaid intended purpose are generally known from the following United States patents issued to William R. Dickie, as follows: Explosive Separable Segmental Nut Including Key and Spline Mean, U.S. Pat. No. 3,120,149, issued Feb. 4, 1964, Explosive Separable Nut, U.S. Pat. No. 3,170,363, issued Feb. 25, 1965, Explosive Separable Nut, U.S. Pat. No. 3,176,573, issued Apr. 6, 1965, and Method of Producing Separable Nut, U.S. Pat. No. 3,268,928, issued Aug. 30, 1966.

Separation nuts are often released (unlatched) by fluid pressure from explosive charges. A well known example of a fluid pressure source of this type is shown in U.S. Pat. No. 3,135,200, issued to Charles H. Jackson on June 2, 1964, entitled "Squib." Of course, fluid sources other than explosives may be utilized, but squibs have the substantial advantage that they can be small in bulk compared to the volume of gases which they generate, may be self-contained, and do not require auxiliary equipment such as hydraulic or pneumatic pumps and reservoirs.

A disadvantage in the prior art separation nut devices resides in the fact that the separation occurs as a consequence of unidirectional or otherwise imbalanced forces which cause a flow to be exerted on the surrounding mechanisms. Especially when delicate instrumention and the like is supported by surrounding structure, it would be better to avoid such flows.

It is an object of this invention to provide a separation nut wherein the applied separation forces are substantially equal and opposite, whereby if any mechanical shock is exerted on the surrounding structure, is at least greatly minimized.

Another disadvantage of the prior art is that expulsion means, when provided, expels the threaded element at the same time as the nut segments are unlatched. As a consequence, there may be some transfer of shock force to surrounding structures. It is an object of this invention to provide a sequentially timed expulsion means which operates only after the separation of the nut segments from the threaded element is substantially complete.

A separation nut according to this invention has an axis of joinder and includes a body which has an inner wall which defines a cavity. A plurality of nut segments are disposed in the cavity and are grouped around this axis. Each segment has an inner surface and an outer surface. There is a thread fragment on each inner surface and when the segments are so grouped, the thread fragments all lie on the path of a reference thread. Each fragment extends for no more than 180 degrees around said axis. A pair of latch surfaces is provided on the outer surface of each of the segments, and a release recess lies between the latch surfaces of each segment. The release recess has a bottom wall which lies closer to the axis than the latch surfaces. A pair of separate latch members are fitted in the cavity between the inner wall and the outer surfaces of the segments, and are axially movable therein. A latch surface is provided on each of the latch members which can be moved between a locked position wherein it bears against a respective latch surface on a segment, and a released position in which it overhangs the release recess. The latch members make a fluid sealing sliding fit in chamber means in the body, whereby introduction of fluid under sufficient pressure into the chamber means against oppositely facing faces of the latch members will simultaneously move the two latch members from their latched to their released positions, the latch members being oppositely directed so that they move in opposite directions relative to each other. Their cross-section areas are substantially equal, and therefore there is no substantial net force exerted on the nut by them at the time of separation.

According to a preferred but optional feature of the invention, an expulsion plunger is slidably fitted in the body so that it will be moved to expel the threaded element from the separation nut when the nut segments are released from it, the plunger being exposed to the same fluid pressure which actuates the latch, but sequentially so, in order that it does not apply a force to expel the threaded element until after the nut segments are substantially completely unlatched.

The above and other features of this invention will be fully understood from the following detailed description and the accompanying drawings in which:

FIG. 3 is a fragmentary axial cross-section showing an optional portion of the invention before actuation of the separation nut.

FIG. 4 is a view similar to FIG. 3 after actuation of the separation nut.

FIG. 5 is a cross-section taken at line 5—5 of FIG. 1.

FIG. 6 is a fragmentary view of a portion of FIG. 2 taken at line 6—6 therein.

FIG. 7 is a fragmentary cross-section taken at line 7—7 of FIG. 1.

FIG. 8 is a top view of one of the nut segments; and

FIG. 9 is a side elevation partly in cutaway cross-section showing the presently preferred embodiment of the invention completing a structural joint.

Figure 1:
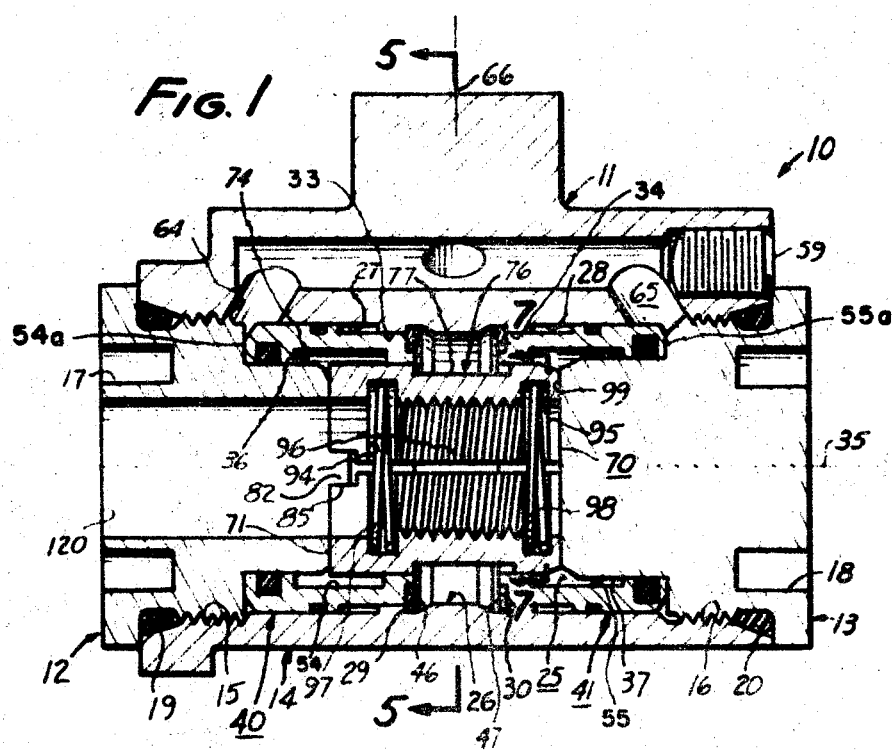
FIG. 1 is an axial cross-section of the presently preferred embodimnt of the invention in its thread-engaging (latched) configuration.

In FIG. 1 there is shown a separation nut 10 according to the invention. The nut includes a body 11 which is formed of three principal portions, a first end member 12, a second end member 13, and a central member 14. The central member 14 includes threads 15, 16, which match similar threads on the two-end members so that they may be joined together. Wrench engaging recesses 17 are formed on end member 12 and wrench engaging recesses 18 are formed in member 13 so that the two end members can be tightly threaded to the central member to assemble the body. Circular seals (O-rings) 19, 20 are provided between the central member and the end members.

The members 12, 13 and 14 form an internal cavity 25. This cavity has an inner wall 26 which includes first and second cylinders 27, 28, a pair of retention grooves 29, 30. A cam surface 31, 32 is contiguous to each of retention grooves 29, 30, respectively. Backing surfaces 33 and 34 are formed on the inner wall of the cavity.

The cylinders, retention grooves, and cam surfaces are coaxial around an axis of joinder 35 which is the axis around which threads and nut segments yet to be described are also concentric.

First and second end members 12 and 13 bear respective cylinders 36, 37 which also are coaxial around the axis of joinder 35. Two latch members 40, 41 are placed between cylinders 27 and 36, and 28 and 37, respectively. Sliding ring seals 42, 43, 44, and 45 respectively make a sliding fluid sealing fit between the cylindrical surfaces (cylinders) and the latch members as shown. Snap rings 46, 47 ("yieldable retainer means") are seated in face grooves 48, 49, in latch members 40 and 41, respectively. The snap rings have a radial dimension which is shown vertically in FIG. 1 which is no greater than the radial depth of the face grooves. The perimeter of the snap ring (see FIG. 7) is no greater than that of the greatest diameter of the groove so that the snap ring can be compressed entirely into the face groove. When it is in its locked latched condition as shown in FIG. 1, the inherent springiness of the snap ring causes snap rings 46 and 47 to spring out into retention grooves 29 and 30, respectively, so as to hold the latch members in the axially spaced-apart positions illustrated in FIG. 1.

Latch members 40 and 41 each bear latch surfaces 50, 51, respectively, and their spacing from the outside wall 52, 53 of the respective latch surfaces is such that they will cause a latch or locking relationship which will further be described below. Reliefs 54, 55 are formed in latch members 40 and 41 away from the center of the device, as shown in FIG. 1. Latch members 40 and 41 have respective end faces 54a and 55a against which fluid pressure is exerted to move the latch means from their latched to their released positions.

The latch members may preferably be ring-shaped and continuous, and the regions formed between the cylinders 27 and 36, and 28 and 37, respectively, to the left of latch member 40 in FIG. 1 and to the right of latch member 41 in FIG. 1 are sometimes herein called chambers 56, 57, (sometimes called "chamber means") respectively. These chambers are annular, being formed between concentric cylindrical cylinders, and a portion of each latch member makes a sliding fluid sealing fit in its respective chamber, or portion of a chamber. The O-rings function as sliding seals. A pressure manifold 58 is formed in the central member 14. It comprises a drilled hole that is closed at its end surface by the plug 59. This manifold is side-tapped by a pair of ports 60, 61 (FIG. 5) which are threaded to receive squibs 62, 63 of the type shown in the aforesaid Jackson patent, or instead to be connected to any other suitable source of fluid under pressure for actuation of the separation nut. Passages 64, 65 interconnect the chambers 56 and 57 with the manifold. Passages 64 and 65 are sometimes called "pressure passage means". They are so disposed and arranged as to transmit fluid under pressure to oppositely facing faces of the latches so as to move the latches in opposite directions. In the example given, they are introduced to the two chambers 56 and 57 and move the latch means together. Where the latch members are to move apart from one another, a single chamber would have been provided between them and pressure applied therein to move them apart from one another. Application of sufficient pressure in the manifold will cause the latch members to move toward the center line 66 of the device which is to say they will not move in the same direction as each other, acting as sliding pistons in their respective chambers.

A plurality of nut segments, in this case three nut segments 70, 71, 72, are grouped around axis of joinder 35. Each of these segments extends for no more than 180° around the axis of joinder, and preferably less. For example, each of the three segments as shown, extends for less than 120°, because there will be gaps 73a, 74a, 75a (FIG. 5) between them, the thickness of which is emphasized for purposes of disclosure in the drawings. Segments 70, 71, and 72 have outer surfaces 73b, 74b, 75b. Because the segments are all alike, only segment 70 will be described in detail. Its outer surface 73b (FIGS. 1 and 8) has a pair of latch surfaces 74, 75 which are spaced apart by a release recess 76 whose bottom 77 extends radially from the axis of joinder to a lesser distance than the latch surfaces i.e., it is closer to the axis than the respective latch surfaces. The latch surfaces comprise fragments of cylinders, and the release recess has shoulders 78, 79 which bound its opposite edges contiguous to the latch surfaces. At the free edges 80, 81 of the segment, there are formed notches 82, 83 ("notch means"). The purpose of these notches is to engage respective splines 85 ("spline means"), 86, 87. As a result, the segments are angularly held relative to one another. Each of nut segments 70, 71, and 72 has an inner surface 90, 91, 92 which again will be described only in connection with segment 70. The inner surface includes a pair of retention grooves 94, 95, and a fragment 96 of a thread. Each of the fragments is of the same reference thread, so that when they are grouped as shown in FIG. 1, the threads lie on the path or track of the same thread. In fact it is best practice to form the three segments from a single, already-threaded cylindrical body by axially slitting the body, thereby accurately forming the gaps and segments. Because the segments are intended to move radially outwardly relative to the axis of the joinder, the walls of the splines and of the notches are either parallel to one another or diverge outwardly in order that the segment movement may be free and unobstructed.

The segments are held in their grouped position by the surrounding structure, and especially by the latch members 40 and 41. They are biased outwardly relative to the latch members by a pair of expanders 97, 98 ("expander means") which are respectively seated in retention grooves 94 and 95. When the segments are grouped, the retention grooves of the segments are aligned. The expanders comprise coil springs which have free ends and a spring diameter when free and uncompressed that is greater than the nominal diameter of the retention grooves when grouped as shown in FIG. 1. The coil springs when compressed thereby will exert an outwardly biasing force on the segments because they will tend to expand toward their free diameter when compressive forces are released from the grouped segments.

The segments bear against a face 99 of second end member 13, although it will be observed that a certain amount of free axial play along axis of joinder 35 is possible in this construction.

Expulsion means 105 is shown in FIGS. 3 and 4. This means comprises a plunger 106 which makes a sliding fluid sealing fit with the inner wall of a cylinder 107 in the body. The plunger includes a piston 108 and a stem 109. The stem passes through a guide 110, is disposed on the axis of joinder, and is axially movable therealong. Guide 110 opens into the cavity. An O-ring 111 is seated in a ring groove 112 on the piston. A spacer 113 (FIG. 4) projects axially from the piston to hold it away from the right hand end of the cylinder so there will always be fluid access to the right hand face of the piston in FIG. 3. Passage 114 enters cylinder 107 at its right hand end. It enters chamber 57 at point 115. Port 115 is separated from port 61 by sliding seal 45 when the nut is in its latched condition. Accordingly, expulsion pressure cannot be exerted in passage 114 until latch member 41 has moved far enough to the left in FIG. 3 to uncover port 115. This will delay the operation of the expulsion means until after a sufficient movement of the latch means has occurred that the unlatching operation of the device will at least have begun before the plunger is brought to bear against the end of an object to be expelled. It will also delay any drop in pressure in chamber 57 relative to chamber 56.

It will be recognized that the expulsion means of FIGS. 3 and 4 may be added to the second end member 13 of FIG. 1, and represents an optional addition to the embodiment of FIG. 1. In fact, it is shown installed in structure which is identical to that of FIG. 1 except for the second end member 13.

An entry passage 120 is formed in the first end member 12 to pass an externally threaded element 121 which may be such as a bolt or stud. This is best shown in FIGS. 3 and 9. Especially in FIG. 9, a bolt 122 which is one type of external threaded element for engagement by the separation nut is shown passing through aligned appertures 123, 124 in work pieces 125, 126 to join to the separation nut 10 of FIG. 1. The separation nut will at that time be in the latched condition as shown in FIG. 1 and may simply be tightened down onto threads carried by the bolt, just as any other nut would be tightened down. The joinder comprising the externally threaded element and the separation nut thereby holds the work pieces together until it is time for separation, when the fluid pressure will be applied for that purpose.

The term "thread" is used broadly to describe surfaces which interengage to hold to objects together. A peripheral groove is also intended to be included in this term, as well as helical grooves, which are more commonly referred to as "threads."

Figure 2:
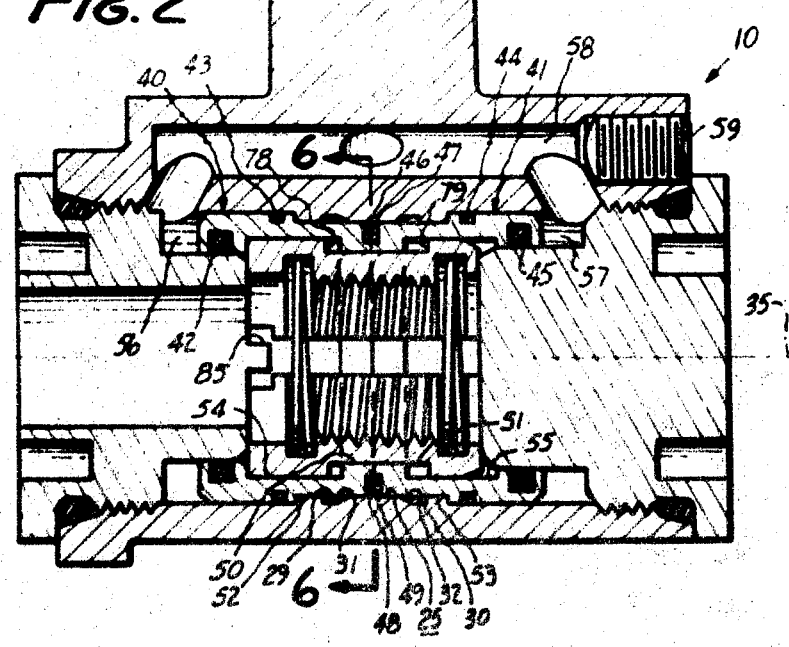
FIG. 2 is a view similar to that of FIG. 1 with the separation nut in its separated (released) condition.

The operation of this device will now be described. With the assembly formed, as in FIG. 9 and assuming that the features of FIGS. 3 and 4 are added to the device of FIG. 1, the separation nut is in place and latched, with the latch members forming a rigid interconnection between their own latch surfaces and the latch surfaces on the outsides of the segments, and backed up by backing surfaces 33 and 34 on the inner wall of the cavity. In FIG. 1 the latch members are in their latched position, and in FIG. 2 are in their released position.

The snap rings spring outwardly so as to limit the excursion of the latch members toward the center of the nut. In order for the latch member to move toward the center, they will have to cause the snap rings to climb the cam surfaces, and the angle and coefficient of friction are such that they will not be able to do this absent sufficient actuating forces.

The expanders 97 and 98 force the segments outwardly to make the compressive contact with the body, and the notches and splines together hold them angularly aligned. Under these circumstances, an externally threaded element, such as bolt 122 may be threaded into the segments and a rigid reliable connection is obtained.

When the joint is to be separated, the squib is fired, or fluid under sufficient pressure from any other source is supplied. Then fluid such as gases, under pressure, enters manifold 58, and the conditions begin to occur as shown in FIGS. 2, 3, and 4 wherein gases flow through passages 64 and 65, to chambers 56 and 57, respectively, and force the latch means in opposite directions relative to each other, i.e. not in the same direction, but toward each other. It is obviously possible to design this device such that the latch members will move apart instead of together, this modification being within the scope of the invention.

The latch members are so designed that their cross-sectional areas relative to their axis of motion, i.e. relative to the axis of joinder, are substantially equal. Because the pressures exerted on them are also equal, no net external force will be generated by their relative motion. Under these circumstances, the latch members move axially until their latch surfaces overhang the release recess 76. Then the expanders will cause the segments to move outwardly into the relief formed in the latch members adjacent to the latch surfaces. The threads of the segments will have moved a sufficient distance relative to the axis of joinder to clear the threads on the bolt. The radial movement of the segments must therefore be at least equal to the amount of overlap of the two sets of threads. In moving from the position shown in FIG. 1 to that shown in FIG. 2, the axial movement of the latch members will have caused the snap rings to climb their respective cam surfaces 31 and 32 and they will then be compressed into the respective face grooves on the latch members and slide along the central portion of the inner wall of the cavity. The seals carried by the latch means will confine the gases to the chambers.

If no expulsion device is utilized, the devices may be manually separated or they may be spring-biased apart by other means. Should the expulsion means of FIGS. 3 and 4 be utilized, it will be noted that when latch member 41 is moved sufficiently to the left in FIGS. 3 and 4, it will have uncovered port 115 and thereby permitted gas under pressure to enter cylinder 107 and force the bolt 122 away from the segments. The axial distance which the expulsion means will move is determined by the parameters of the installation and is, of course, arbitrary. Preferably, but not necessarily, port 115 will not be substantially opened until after the latches nearly reach the end of their unlatching travel in order that pressure on the right hand latch member 41 will not drop appreciably until the unlatching operation is completed, and the expulsion force will not be exerted until the threads can clear one another.

This device comprises a readily manufactured, simple and reliable separation nut which is rigidly assembled for use as a nut or collar until it is actuated, and which, upon actuation, acts to separate a group of nut segments without a substantial net external force, and which after that occurs, is able to exert a sequential expulsive force.

This invention is not to be limited by the embodiments shown in the drawings and described in the description which are given by way of example and not of limitation, but only in accordance with the scope of the appended claims.

I claim:

1. A separation nut having an axis of joinder, comprising a body having an inner wall defining a cavity; a plurality of nut segments in said cavity and grouped around said axis of joinder, an inner surface and an outer surface on each segment; a thread fragment on each nut segment, the fragments all comprising a part of a reference thread, whereby when the nut segments are grouped around the axis of joinder, their tread segments lie on the path of said reference thread, each segment extending for no more than 180° around said axis, a pair of latch surfaces on the outer surface of each of said segment; a release recess lying between the latch surfaces of each segment, the release recess having a bottom which lies closer to the axis than the latch surfaces on the respective segment, a pair of separate latch members in said cavity between said inner wall and the outer surfaces of said segments, a latch surface on each of said latch members, each of said latch members being axially slidable between a latched position in which its respective latch surfaces bear against a respective latch surface of a segment, and a released position in which the latch surface of the latch member overhangs the release recess, chamber means in said body in which a portion of each of said latch members makes a sliding fluid sealing fit, pressure passage means entering the chamber means so as to communicate with oppositely facing faces of the latch members, whereby introduction of fluid under sufficient pressure in the said chamber means will simultaneously move the latch members in opposite axial directions from their latched to their released position, the cross-section area of the latch members exposed to said fluid being substantially equal 2. A separation nut according to claim 1 in which the latch members are both continuous rings, and in which the chamber means is annular, the latch members carrying sliding seals which contact the latch members and the body.

3. A separation nut according to claim 1 in which the chamber means is bounded by concentric cylindrical cylinders, the latch members being ring-shaped and carrying fluid sealing sliding seals in contiguous sliding contact with the aforesaid cylinders 4. A separation nut according to claim 1 in which a pair of retention grooves is provided in the inner wall and in which yieldable retainer means carried by the latch members yieldingly holds the latch members in their latched position by engagement in a respective retention groove 5. A separation nut according to the claim 4 in which the retainer means comprises snap rings 6. A separation nut according to claim 1 in which expander means is fitted inside the grouped segments, bearing against the same and tending to bias them to a radially outer position 7. A separation nut according to claim 6 in which said expander means comprises a coil spring whose diameter when the spring is free and uncompressed is greater than that which it assumes when the segments are grouped 8. A separation nut according to claim 1 in which spline means is formed on the body engageable with notch means in the nut segments to hold them angularly relative to one another 9. A separation nut according to claim 1 in which expulsion means is provided in the body in axial alignment with the axis of joinder and opening into said cavity.

10. Separation nut according to claim 9 in which the separation means comprises a cylinder formed in the body, a plunger slidable in said cylinder, and passage means so disposed and arranged as to be connected to a source of fluid under pressure only after the latch members have moved from a latched position.

11. A separation nut according to claim 6 in which spline means is formed on the body engageable with notch means in the nut segments to hold them angularly relative to one another.

12. A separation nut according to claim 11 in which expulsion means is provided in the body in axial alignment with the axis of joinder and opening into said cavity 13. A separation nut according to claim 12 in which the separation means comprises a cylinder formed in the body, a plunger slidable in said cylinder, and passage means so disposed and arranged as to be connected to a source of fluid under pressure only after the latch members have moved from a latched position.

14. A separation nut according to claim 13 in which the latch members are both continuous rings, and in which the chamber means is annular, the latch members carrying sliding seals which contact the latch members and the body.

15. A separation nut according to claim 14 in which the chamber means is bounded by concentric cylindrical cylinders, the latch members being ring-shaped and carrying fluid sealing sliding seals in contiguous sliding contact with the aforesaid cylinders.

16. A separation nut according to claim 15 in which a pair of retention grooves is provided in the inner wall and in which yieldable retainer means carried by the latch members yieldingly holds the latch members in their latched position by engagement in a respective retention groove 17. A separation nut according to claim 1 in which said chamber means comprises a pair of chambers, one disposed adjacent to each of the farthest apart ends of the latch members, and in which said pressure passage means enters each of said chambers whereby to introduce fluid under pressure substantially simultaneously to both chambers, and to move the latch members toward one another.

18. A separation nut according to claim 17 in which the latch members are both continuous rings, and in which the chamber means is annular, the latch members carrying sliding seals which contact the latch members and the body.

19. A separation nut according to claim 17 in which a pair of retention grooves is provided in the inner wall and in which yieldable retainer means carried by the latch members yieldingly holds the latch members in their latched position by engagement in a respective retention groove 20. A separation nut according to claim 17 in which expander means is fitted inside the grouped segments, bearing against the same and tending to bias them to a radially outer position 21. A separation nut according to claim 20 in which said expander means comprises a coil spring whose diameter when the spring is free and uncompressed is greater than that which it assumes when the segments are grouped.

22. A separation nut according to claim 17 in which expulsion means is provided in the body in axial alignment with the axis of joinder and opening into said cavity.

23. A separation nut according to claim 22 in which the separation means comprises a cylinder formed in the body, a plunger slidable in said cylinder, and passage means so disposed and arranged as to be connected to a source of fluid under pressure only after the latch members have moved from a latched position.

* * * * *

UNITED STATES PATENT OFFICE
CERTIFICATE OF CORRECTION

PATENT NO. : 3,813,984
DATED : June 4, 1974
INVENTOR(S) : ERIC P. SELINDER

It is certified that error appears in the above-identified patent and that said Letters Patent are hereby corrected as shown below:

Col. 3, line 57, "mean" should read --means--

Col. 5, line 44, "to", second occurrence, should read --two--

Col. 7, line 6
(Cl. 1, line 3), cancel "and"

Col. 7, line 11
(Cl. 1, line 8), "tread" should read --thread--

Col. 7, lines 14-15
(Cl. 1, lines 11-12), cancel "of said"

Col. 7, line 23
(Cl. 1, line 20), "surfaces bear" should read --surface bears--

Signed and Sealed this sixteenth Day of September 1975

[SEAL]

Attest:

RUTH C. MASON
Attesting Officer

C. MARSHALL DANN
Commissioner of Patents and Trademarks